United States Patent [19]

Sano et al.

[11] Patent Number: 4,620,257
[45] Date of Patent: Oct. 28, 1986

[54] CARRIER RELAY SYSTEM

[75] Inventors: Yoshihiro Sano, Katsuta; Fumio Iwatani, Hitachi; Takao Kubo, Hitachi; Yoshiteru Miki, Hitachi, all of Japan

[73] Assignee: Hitachi, Ltd., Tokyo, Japan

[21] Appl. No.: 632,846

[22] Filed: Jul. 20, 1984

[30] Foreign Application Priority Data

Jul. 21, 1983 [JP] Japan ................. 58-134158

[51] Int. Cl.$^4$ ............................................. H02H 7/26
[52] U.S. Cl. ...................................... 361/68; 361/64; 174/40 R
[58] Field of Search ............................... 361/64, 66–69; 340/310 A; 250/227; 307/147; 174/40 R, 41

[56] References Cited

U.S. PATENT DOCUMENTS 4,234,901 11/1980 Strickland, Jr. .................. 361/64
4,359,598 11/1982 Dey et al. ....................... 174/40 R
4,371,908 2/1983 Andow et al. ................... 361/68 X

FOREIGN PATENT DOCUMENTS 13149 2/1978 Japan ................................ 361/68

OTHER PUBLICATIONS

"Current Differential Type Protective System for Optical PCM Transmission"–General Meeting IEE of Japan, 1983, No. 1218.
Digital Differential Relaying System for Transmission Line Primary Protection Using Travelling Wave Theory-It Theory and Field Experience"–Takagi et al–Conference–IEEE 1979 Power Engineering Society Winter Meeting, New York, Feb. 4–9, 1979.

*Primary Examiner*—A. D. Pellinen
*Assistant Examiner*—A. Jonathan Wysocki
*Attorney, Agent, or Firm*—Antonelli, Terry & Wands

[57] ABSTRACT

In a carrier relay system in which protective relay apparatus are disposed in terminal stations respectively and interchange information between the terminal stations via a signal transmission line for detecting a trouble occurred in power transmission lines on the basis of the exchanged information, specific information K is inserted in a predetermined position of a signal transmitted from the first terminal station to the second terminal station, and the specific information K is inserted intact in another predetermined position of a signal returned from the terminal station to the terminal station. In the terminal station, the specific information K inserted in the signal transmitted therefrom is compared with the specific information K inserted in the signal returned from the terminal station for deciding the presence or absence of a trouble occurred in the power transmission lines. The signal transmission line extending between the terminal stations includes two transmission channels, and circuit breakers are tripped when a fault has occurred in one or both of the signal transmission channels and a trouble detection relay has operated.

8 Claims, 10 Drawing Figures

| ROUTE STATUS | | | BOTH NORMAL | | 1ST ROUTE ONLY NORMAL | | 2ND ROUTE ONLY NORMAL | | BOTH ABNORMAL | |
|---|---|---|---|---|---|---|---|---|---|---|
| | | | 1ST | 2ND | 1ST | 2ND | 1ST | 2ND | 1ST | 2ND |
| | | | ○ | ○ | ○ | × | × | ○ | × | × |
| TRANSMIT | 1ST ROUTE | | $-k$ | | | | | | | |
| | 2ND ROUTE | | $k$ | | | | | | | |
| RECEIVE | 1ST ROUTE | | $-k$ | | $-k$ | | — | | — | |
| | 2ND ROUTE | | $k$ | | — | | $k$ | | — | |
| DECISION | | | 0 | | $-k$ | | $k$ | | 0 | |

…

CARRIER RELAY SYSTEM

BACKGROUND OF THE INVENTION

FIELD OF THE INVENTION

This invention relates to a so-called carrier relay system in which the quantities of electricity detected at individual terminal stations of a power transmission system are transmitted between the terminal stations for the purpose of protection of power transmission lines, and more particularly to a carrier relay system in which optical fibers incorporated in an overhead ground wire are used as a signal transmission medium.

Two types of carrier relay systems are widely known and employed in this field of the art. In the former type of power line transmission type, power transmission lines themselves are used as signal transmission routes, while, in the latter type or microwave transmission type, microwave circuits are used for the signal transmission. However, the former type has such a drawback that apparatus including power line connectors of large capacity and large scale are required. The latter type has also such a problem that approval by the administrative agencies of the state is required for the use of the microwave circuits as signal transmission routes, and, thus, the microwave circuits cannot be adopted freely for this purpose.

On the other hand, the modern progress of technology promotes extended use of optical fiber cables, and an overhead grounding wire combines with optical fiber (referred to hereinafter as an OPGW) having an optical fiber built in an overhead ground wire extending in parallel with the power transmission lines has already been developed and put into practical use.

The economomic advantage of employment of such an OPGW is comparable to that of the microwave circuit, and, therefore, there is now a strong tendency toward positive utilization of the internal optical fiber of the OPGW as a signal transmission route for protective relays including PCM carrier relays.

In a conventional microwave circuit, the adverse effect of fading due to a natural phenomenon such as a lightning discharge is inevitable. It has therefore been a common practice that a signal transmission route associated with a power transmission line to be protected is divided into two signal transmission routes laid in respectively different areas. (Such an arrangement will be referred to hereinafter as a duplex route arrangement.) That is, this duplex route arrangement is based on the expectation that, even when one of the two transmission routes may be affected by a lightning discharge, the other will not be affected and will remain sound.

However, the internal optical fiber of the OPGW is not adversely affected by the fading nor the electromagnetic action of lightning. Also, since the OPGW itself is supported on the same steel tower on which the associated power transmission line to be protected is also supported, there is no necessity to lay another OPGW as a signal transmission route extending in an area different from the area in which the power transmission line to be protected extends. Therefore, it is the present tendency that two optical fibers are incorporated in the OPGW when it is desired to duplex the signal transmission route for improving the reliability of the relay system.

A relay system has been proposed in which optical-fiber signal transmission routes arranged in duplex on the basis of the above idea are provided so that, even when a fault occurs in one of the optical fibers, the faulty signal transmission route can be switched over to the other optical fiber. Such a relay system is disclosed in a paper entitled "Current Differential Type Protective System for Optical PCM Transmission" reported in the General Meeting of the Institute of Electrical Engineers of Japan, 1983, No. 1218.

In the protective relay disclosed in the paper above described, occurrence of a fault in only one of the optical fibers arranged in duplex is detected by, for example, an error detecting circuit which acts to change over an optical fiber change-over or selector switch, so that the relay continues to operate on the basis of data received via the stand-by optical fiber. However, in the event that the steel tower supporting the power transmission line and the associated OPGW falls down for some reason, both of the optical-fiber signal transmission routes arranged in duplex will be simultaneously damaged. Therefore, the proposed protective system is defective in that concurrent occurrence of grounding and short-circuit troubles results in impossibility of the desired relay operation or malfunction of the protective relay, and the protective relay cannot achieve its primary function of system protection.

SUMMARY OF THE INVENTION

The proposed protective system will be described in further detail. A differential method is generally employed as the operating principle of a carrier relay acting as a protective relay. As will be most readily understood from consideration of the operation of a current differential type protective relay which is a typical example of the carrier relay, currents at both of its terminals are summed so that the sum can be maintained to be zero. For example, in a relay disposed in each terminal station, an inflow current provides a positive output, while an outflow current provides a negative output, and the sum of these outputs is found or computed. Thus, in the event of occurrence of an internal fault, currents flow in from the both terminals, and the sum is not equal to zero. Also, in the event of occurrence of a trouble in the signal transmission system, the sum of currents is not equal to zero. Absence of any current input from the opposite terminal station is equivalent to, for example, detection of 0 amperes at the opposite terminal station, and, at that time, its own terminal station detects some current. Since the carrier relay malfunctions to mis-trip associated circuit breakers in the event of occurrence of such a trouble in the signal transmission system, the carrier relay is indispensably required to inhibit its relay output upon detection of such a trouble. The carrier relay of such a character is unable to exhibit the system protecting function when grounding and short-circuit troubles as described above occur simultaneously in the optical-fiber signal transmission routes arranged in duplex.

Although the carrier relay using the optical fibers as signal transmission routes is hardly adversely affected by a natural phenomenon as described above, means for preventing accidental tripping of the associated circuit breakers due to an abnormal signal transmission is indispensably required considering the possibility of a trouble that may occur in associated elements such as opto-electrical transducer elements or electro-optical transducer elements. Also, collapse of a steel tower is frequently encountered due to, for example, a snow storm or an earthquake although it is generally considered to be a rare case. Especially, in northern districts, wire disconnection and tower collapse owing to icing on power transmission lines and steel towers are frequently experienced. The wire disconnection and tower collapse are almost inevitably accompanied by grounding or short-circuit trouble.

It is therefore a primary object of the present invention to provide a carrier relay system which uses optical fibers as signal transmission routes and which can reliably protect power transmission lines even when collapse of a steel tower occurs and is detected.

In accordance with the present invention which attains the above object, there is provided a carrier relay system including an overhead ground wire having at least two self-contained signal transmission routes, steel towers supporting the overhead ground wire together with power transmission lines, and protective relay apparatus disposed in first and second terminal stations respectively for exchanging information via the two signal transmission routes contained in the overhead ground wire and detecting the source of a trouble, if any, which may have occurred in the power transmission lines, wherein the protective relay apparatus disposed in the first terminal station transmits a first specific signal via the first signal transmission route and a second specific signal via the second signal transmission route, while the protective relay apparatus disposed in the second terminal station transmits a third specific signal via the first signal transmission route and a fourth specific signal via the second signal transmission route, and each of the protective relay apparatus comprises means for monitoring the specific signals transmitted from and received at its own terminal station, protective means for detecting a trouble, if any, which may have occurred in the power transmission lines, and means for generating a protective output protecting the power transmission lines on the basis of the outputs of the protective means and the signal monitoring means, whereby accidental fall-down of any one of the steel towers can also be detected, to protect the power transmission system.

BRIEF DESCRIPTION OF THE DRAWINGS

The present invention will be apparent from the following detailed description taken in conjunction with the accompanying drawings, in which.

DESCRIPTION OF THE PREFERRED EMBODIMENTS

Figure 1:
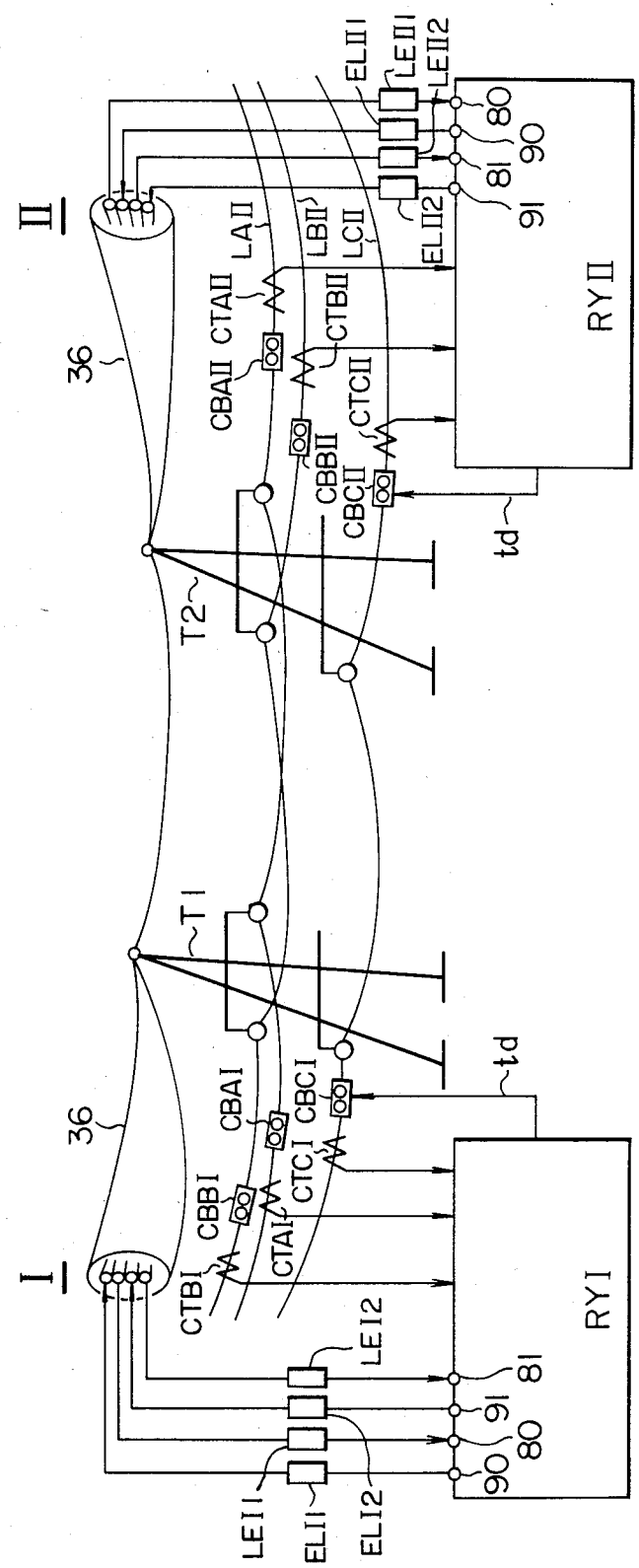
FIG. 1 shows diagrammaticallly how an embodiment of the carrier relay system according to the present invention is connected to a power system.

Referring now to FIG. 1 showing diagrammatically how an embodiment of the carrier relay system according to the present invention is connected to a power system, an OPGW 36 and power transmission lines L are supported by steel towers T1 and T2. In FIG. 1, the symbols CT, CB, L, RY, LE and EL designate current transformers, circuit breakers, power transmission lines, carrier relay apparatus, optoelectrical transducers, and electro-optical transducers respectively, and the symbols A, B and C suffixed to the above symbols indicate that those elements belong to the A-phase, B-phase and C-phase respectively. Also, the symbols I and II are further suffixed to indicate that those elements are installed in or associated with electrical terminal stations I and II respectively.

It will be apparent from FIG. 1 that each of the carrier relay apparatus RYI and RYII receives currents $i_A$, $i_B$ and $i_C$ from the associated A-phase, B-phase and C-phase current transformers CT and applies a trip command signal $t_d$ to the associated A-phase, B-phase and C-phase circuit breakers CB. Although FIG. 1 shows that the trip command signal $t_d$ from each of the carrier relay apparatus RYI and RYII is applied to the associated C-phase circuit breaker CBC only, it is apparent that it is also applied at the same time to the associated A-phase and B-phase circuit breakers CBA and CBB. In FIG. 1, the reference numerals 90, 80, 91 and 81 designate terminals for connection to optical fibers incorporated in the OPGW 36, and the terminal combinations 90, 80 and 91, 81 constitute a fourwire carrier system.

Figure 2:
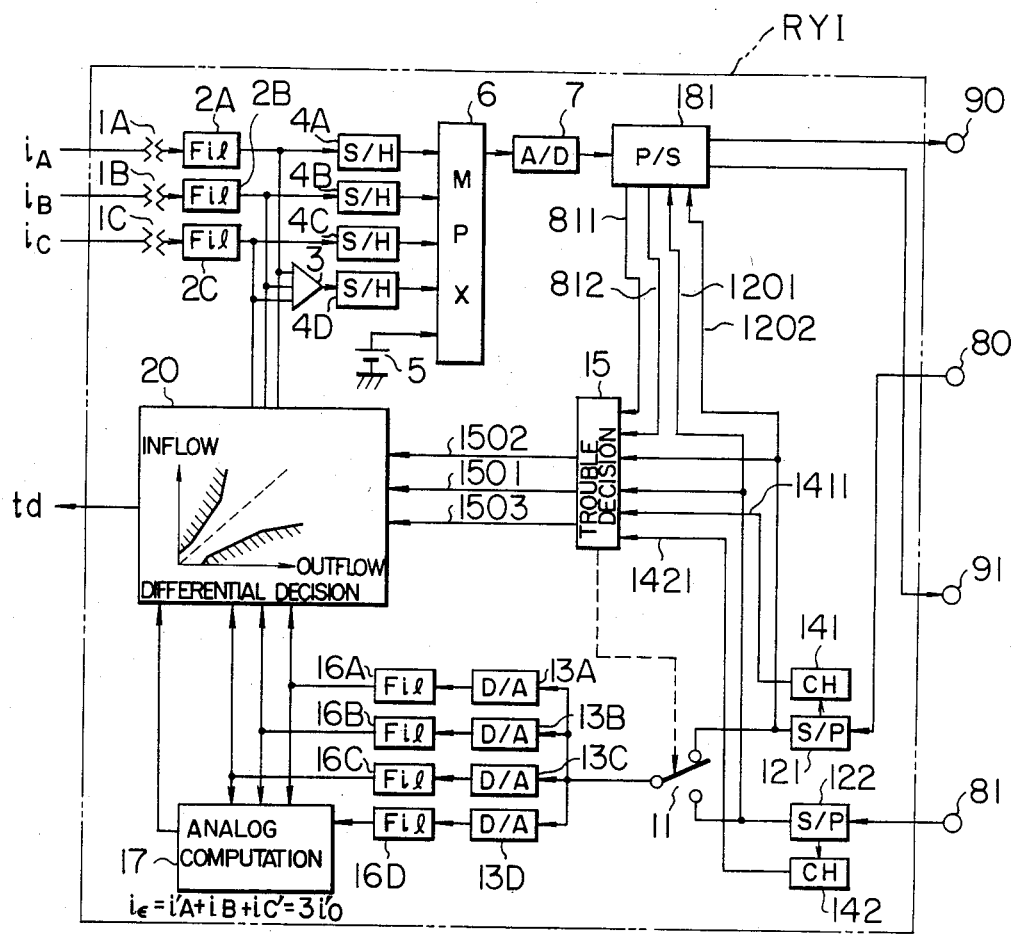
FIG. 2 is a block diagram showing the structure of one of the carrier relay apparatus shown in FIG. 1.

FIG. 2 is a block diagram showing the practical structure of the carrier relay apparatus RYI in the terminal station I.

Referring to FIG. 2, the carrier relay apparatus RYI includes auxiliary input transformers 1A, 1B, 1C, and input filters 2A, 2B, 2C corresponding to the A-phase, B-phase and C-phase respectively. An adder circuit 3 adds the outputs from these three input filters 2A to 2C. Sample-hold circuits 4A, 4B, 4C and 4D are connected to the input filters 2A to 2C and to the adder circuit 3 respectively, and each of these sample-hold circuits 4A to 4D samples the signal appearing at its input terminal under command of a clock circuit (not shown) and holds the result of sampling until the next sampling is commanded. A regulated voltage source 5 is provided for the purpose of DC monitoring, and its output is applied together with the outputs of the sample-hold circuits 4A to 4D as inputs to a multiplexer 6 disposed in the succeeding stage. The output of multiplexer 6 switched over under command of the clock circuit (not shown) is converted into the corresponding digital quantity by an A/D converter 7. The data including the three-phase current data obtained by conversion of the analog quantities into the digital quantities by the A/D converter 7, the data indicative of the sum of the three-phase current data, and the regulated voltage data for the DC monitoring purpose are edited into a serial signal by a parallel-serial conversion circuit 181 which acts also to add a synchronous word, an error control bit, etc. to the serial signal. The serial signal thus prepared is sent out from the terminal 90 on the 1st-route optical fiber through the 1st-route electro-optical transducer LEI1 and also sent out from the terminal 91 on the 2nd-route optical fiber through the 2nd-route electrooptical transducer LEI2, to be transmitted to the associated terminals 80 and 81 respectively of the opposite terminal station II.

The carrier relay apparatus RYII in the opposite terminal station II has a structure similar to that of the carrier relay apparatus RYI described above, and the information signal or serial signal from the terminal station II is similarly transmitted from the terminals 90 and 91 to the terminal station I through the electrooptical transducers ELII1 and ELII2 acting as the signal transmitting elements of the carrier relay apparatus RYII in the terminal station II, and through the two optical fibers respectively. The serial signal transmitted from the terminal station II is converted into the corresponding electrical signals by the opto-electrical transducers LEI1 and LEI2 to appear at the terminals 80 and 81 respectively of the carrier relay apparatus RYI. These electrical signals are applied to the respective terminals of a change-over switch 11 in which one of the terminals is selectively engaged while the other is maintained in the stand-by position. Therefore, one of the electrical signals applied to the selectively-engaged terminal of the switch 11 is selected to be used for the protective processing operation of the carrier relay apparatus RYI.

Serial-parallel conversion circuits 121 and 122 decode the synchronous word included in the serial signal to find the start point of bit synchronization in the received signal so as to transform the serial signal into parallel signals upon reception of such a word. The three-phase current data, the sum of the three-phase current data, and the DC-monitoring regulated voltage data are distributed to D/A converters 13A to 13D and a DC monitor circuit (not shown) respectively. Error detection circuits 141 and 142 detect errors included in the electrical signals received and serial-parallel converted by the serial-parallel conversion circuits 121 and 122 respectively. A trouble decision circuit 15 controls the change-over switch 11 depending on whether or not an error is detected by the error detection circuit 141 or 142. Thus, the trouble decision circuit 15 decides whether or not one or both of the signal transmission routes are abnormal. Filters 16A to 16D remove higher harmonic components from the outputs of the respective D/A converters 13A to 13D so as to reproduce the information signal waveform which existed before being sampled in the opposite terminal station II. An analog computation circuit 17 computes a restraining force $i_\epsilon$ according to the equation illustrated in FIG. 2 in response to the application of the outputs from the filters 16A to 16D. A ratio differential decision circuit 20 deciding the ratio between the inflow and outflow currents according to the known differential principle receives the three-phase current data from the filters 2A to 2C in the carrier relay apparatus RYI in its own terminal station I, receives the three-phase current data transmitted from the opposite terminal station II and filtered by the filters 16A to 16C and receives also the restraining signal from the analog computation circuit 17. In response to application of such signals, the differential decision circuit 20 utilizes the illustrated ratio characteristic to detect a route fault, if any, of any one of the signal transmission routes according to the known differential principle. The ratio characteristic referred to above is expressed, for example, as follows:

$$|\Sigma i| - \Sigma |i| \geq i_0 \qquad (1)$$

where $\Sigma i$ is the vector sum of the currents of a predetermined phase detected in its own and the opposite terminal stations, and $\Sigma |i|$ is the scalar sum of the currents of a predetermined phase detected in its own and the opposite terminal stations.

The carrier relay apparatus ultilizing optical fibers for signal transmission and reception has a structure as outlined above. The carrier relay apparatus employed in the present invention is featured by the fact that it has additional novel functions as will be described now.

The present invention employs a signal format as shown in FIGS. 3(a) and 3(b). Referring to FIGS. 3(a) and 3(b), the signal format includes a synchronizing signal SYC, data of three-phase currents $i_A$, $i_B$, $i_C$, a data of the sum current $i_0$, a DC monitoring word DC and specific information K and k added according to the present invention. In FIGS. 3(a) and 3(b), the symbols I and II are suffixed to discriminate between the signals detected in the terminal stations I and II respectively.

The signal format will be described in further detail with reference to FIGS. 3(a) and 3(b). FIG. 3(a) indicates the mode of signal transmission by way of the 1st signal transmission route, and FIG. 3(b) indicates the mode of signal transmission by way of the second signal transmission route. The terminal station I transmits the signals of the format shown at the upper left-hand portions of FIGS. 3(a) and 3(b). These signals transmitted via the 1st and 2nd routes to the terminal station II are those detected in the terminal station I. After reception of these signals, the terminal station II transmits the signals of the format shown at the lower right-hand portions of FIGS. 3(a) and 3(b). These signals transmitted to the terminal station I are those detected in the terminal station II. In this case, the inserted position of the specific information K and k in the signals transmitted from the terminal station II is changed. After receiving these signals, the terminal station I transmits its own information again. In this case too, the inserted position of the specific information is changed to restore the original signal format. The signals are transmitted and received in the manner above described in both the 1st and 2nd signal transmission routes. However, when K and −k are used as the specific information in the 1st signal transmission route, the polarity inverted equivalents −K and k are used as the specific information in the 2nd signal transmission route.

The novel functions added according to the present invention will be described in detail with reference to FIG. 2.

The parallel-serial conversion circuit 181 in the carrier relay apparatus RYI has the following three additional novel functions compared with that of a conventional parallel-serial conversion circuit. According to the first function, the specific information K is inserted in a predetermined position #m of the signal sent out from the carrier relay apparatus RY1 on the 1st transmission route, and the specific information −k having been inserted in the predetermined position #m in the signal transmitted from the opposite terminal station II by way of the 1st transmission route and received by its own terminal station I is inserted in another predetermined position #n in the signal sent out from the terminal station I on the 1st transmission route.

According to the second function, the specific information −K is inserted in the predetermined position #m in the signal sent out from the carrier relay apparatus RY1 on the 2nd transmission route, and the specific information k having been inserted in the predetermined position #m in the signal transmitted from the terminal station II by way of the 1st transmission route and received by its own terminal station I is inserted in the predetermined position #n in the signal sent from the terminal station I on the 1st transmission route.

According to the third function, the specific information K and −K are applied from the parallel-serial conversion circuit 181 to the trouble decision circuit 15, described later, by way of signal lines 811 and 812 respectively.

The carrier relay apparatus RY2 has also the same functions so that the position of the specific information K and k in the transmitted and received signals can be changed.

The outputs 1202 and 1411 from the serial-parallel conversion circuit 121 and error detection circuit 141 respectively associated with the data signal received by way of the 1st transmission route and the outputs 1201 and 1421 from the serial-parallel conversion circuit 122 and error detection circuit 142 respectively associated with the data signal received by way of the 2nd transmission route are applied to the decision circuit 15 in the carrier relay apparatus RY1. On the basis of these signals and the specific information k and K applied by way of the respective signal lines 811 and 812, the decision circuit 15 executes trouble decision processing which will be described later with reference to FIG. 4. When the result of processing in the decision circuit 15 proves that the 1st transmission route is abnormal although the 2nd transmission route is normal, an output signal of "1" level appears on a signal line 1501, while, when the result of processing proves that the 2nd transmission route is abnormal although the 1st transmission route is normal, an output signal of "1" level appears on another signal line 1502. On the other hand, when the result of processing proves that both of the 1st and 2nd transmission routes are abnormal, an output signal of "1" level appears on another signal line 1503. These signal lines 1501, 1502 and 1503 are connected to the differential decision circuit 20 deciding the current ratio according to the known differential principle.

Figure 5:
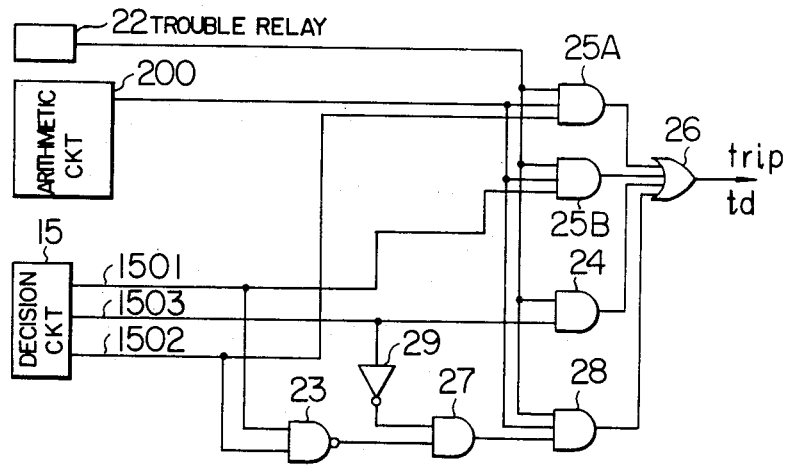
FIG. 5 shows a logic sequence diagram for tripping the circuit breakers on the basis of the result of operation of the protective relays and the result of decision using the four specific information.

The differential decision circuit 20 decides the current ratio according to the known differential principle on the basis of the current data detected in its own terminal station I, the current data transmitted from the opposite terminal station II and the restrain data applied from the analog computation circuit 17. Further, on the basis of the information applied by way of the signal lines 1501, 1502 and 1503, sequence processing which will be described later with reference to FIG. 5 is executed to attain the object of the present invention.

The operation sequence of the carrier relay apparatus constructed as shown in FIG. 2 will now be described.

(1) As seen in FIGS. 3a and 3b, the signal of the predetermined format transmitted from the terminal station I to the opposite terminal station II in time-division cyclic mode includes the information words $i_{AI}$, $i_{BI}$ and $i_{CI}$ indicative of the three-phase current data detected at its own terminal station I, the information word $i_{OI}$ indicative of the sum of the three-phase current data, and the DC monitoring word DC. Besides the above words, the specific information K is inserted in the predetermined position #m when the signal is transmitted by way of the 1st optical fiber route as shown in FIG. 3(a), while the specific information −K is inserted in the predetermined position #m when the signal is transmitted by way of the 2nd optical fiber route, as shown in FIG. 3(b).

(2) In the opposite terminal station II, these transmitted signals are received by the receiving parts associated with the 1st and 2nd transmission routes respectively. When the receiving part associated with the 1st transmission route receives the specific information K (which remains intact if no abnormal condition has occurred in the transmission route) inserted in the predetermined position #m, this specific information K is inserted intact in the predetermined position #n of the signal transmitted from the terminal station II to the terminal station I by way of the 1st optical fiber route. Similarly, when the receiving part associated with the 2nd transmission route receives the specific information −K (which remains intact if no abnormal condition has occurred in the transmission route) inserted in the predetermined position #m, this specific information −K is inserted intact in the predetermined position #n of the signal transmitted from the terminal station II to the terminal station I by way of the 2nd optical fiber route.

(3) In the terminal station I, the four specific information, that is, the specific information K transmitted therefrom by way of the 1st optical fiber route, the specific information −K transmitted therefrom by way of the 2nd optical fiber route, the specific information K inserted in the predetermined position #n of the signal transmitted from the terminal station II by way of the 1st optical fiber route, and the specific information −K inserted in the predetermined position #n of the signal transmitted from the terminal station II by way of the 2nd optical fiber route, are processed or, for example, added together to decide whether or not the optical fiber routes through which the signals are transmitted and received are abnormal.

Figure 3:
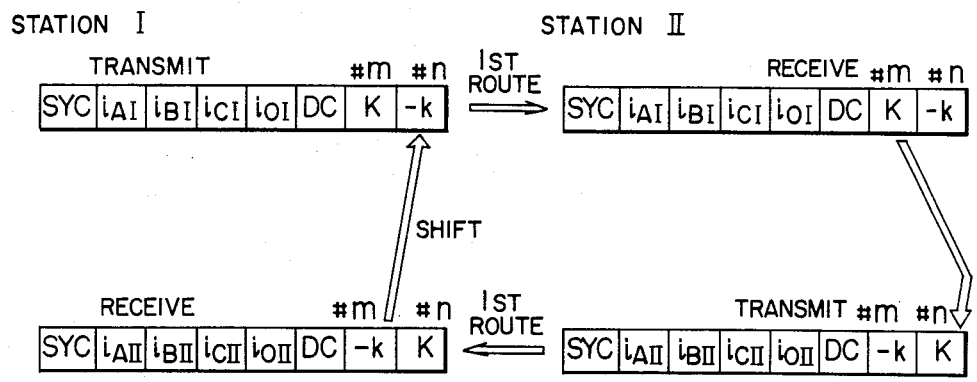
FIGS. 3(a) and 3(b) illustrates a signal format used for transmission and reception of signals between the terminal stations shown in FIG. 1.

Although the other specific information k and −k are also illustrated in FIG. 3, the decision is based on the specific information K and −K herein for simplicity of description.

Figure 4:
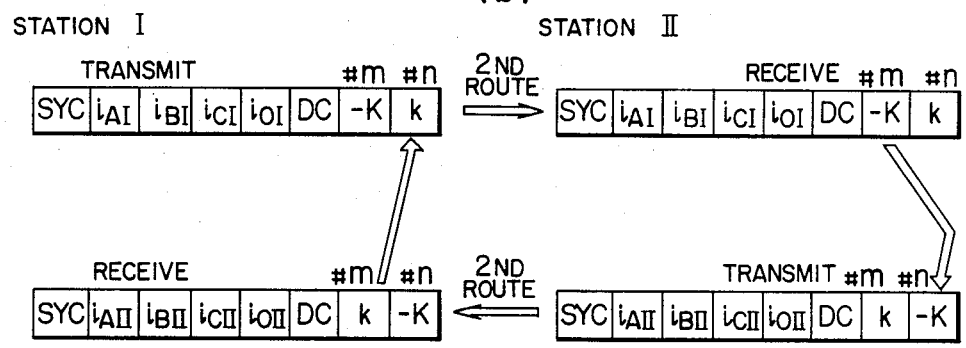
FIG. 4 illustrates how a faulty signal transmission route is determined on the basis of four specific information included in the transmitted and received signals.

(4) FIG. 4 illustrates one form of the manner of decision of the presence or absence of an abnormal route.

It will be seen from FIGS. 3(a) and 3(b) and FIG. 4 that the specific information K is inserted in the predetermined position #m of the signal transmitted via the 1st transmission route, the specific information −K is inserted in the predetermined position #m of the signal transmitted via the 2nd transmission route, the specific information K is inserted in the predetermined position #n of the signal received via the 1st transmission route, and the specific information −K is inserted in the predetermined position #n of the signal received via the 2nd transmission route. Therefore, the result of addition of these four specific information is as follows:

$$(K)+(-K)+(K)+(-K)=0 \tag{2}$$

If a fault occurs in the 2nd transmission route, the specific information (−K) cannot be received at the receiving part associated with the 2nd transmission route in the terminal station I, and the result of addition is as follows:

$$(K)+(-K)+(K)+(\text{unreceived})=K \tag{3}$$

Similarly, if a fault occurs in the 1st transmission route, the specific information (K) cannot be received at the receiving part associated with the 1st transmission route in the terminal station I, and the result of addition is as follows:

$$(K)+(-K)+(\text{unreceived})+(-K)=-K \quad (4)$$

Also, when a fault occurs in both of the 1st and 2nd transmission routes, the result of addition is as follows:

$$(K)+(-K)+(\text{unreceived})+(\text{unreceived})=0 \quad (5)$$

Thus, the sequential processing according to these four results of decision is executed in the terminal station I so that the carrier relay apparatus can make its proper protective relay action.

Figures 6, 7:
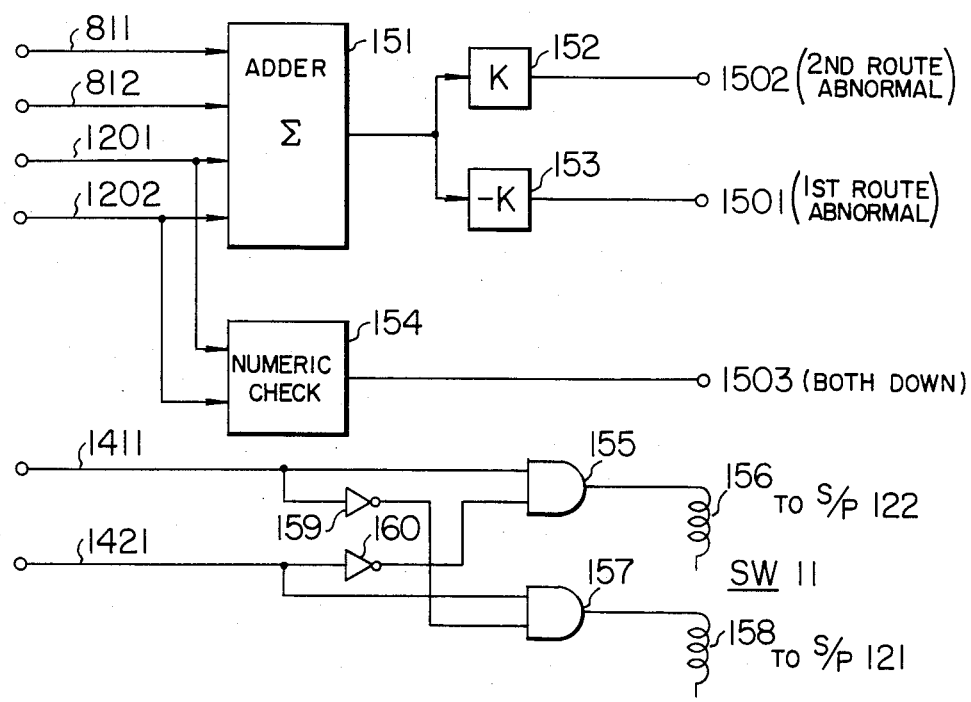
FIG. 6 is a block diagram showing the structure of one form of the decision circuit shown in FIG. 2.
FIG. 7 is a modification of the decision table shown in FIG. 4.

FIG. 6 illustrates the manner of sequential processing executed in one form of the decision circuit 15 shown in FIG. 2. As shown in FIG. 2, the specific information data 811 and 812 transmitted via the 1st and 2nd transmission routes from the carrier relay apparatus RYI in its own terminal station I are applied to the decision circuit 15 together with the specific information data 1201 and 1202 transmitted via the 1st and 2nd transmission routes from the carrier relay apparatus RYII and together with the outputs 1411 and 1421 of the error detection circuits 141 and 142.

Referring to FIG. 6, an adder 151 adds the four specific information signals 811, 812, 1201 and 1202 applied thereto. As described with reference to FIG. 4, the 1st transmission route is normal (that is, the 2nd route is abnormal) when the result of addition is K, while, the 2nd transmission route is normal (that is, the 1st transmission route is abnormal) when the result of addition is $-K$. Discrimination circuits 152 and 153 discriminate as to whether the output of the adder 151 is indicative of K or $-K$ respectively. The output of the discrimination circuit 153 appearing on the signal line 1501 is indicative of the fact that "the 1st transmission route only is abnormal", while, the output of the discrimination circuit 152 appearing on the signal line 1502 is indicative of the fact that "the 2nd transmission route only is abnormal". A numeric check circuit 154 detects the absence of the signals transmitted from the opposite terminal station II and received via the 1st and 2nd transmission routes on the basis of the absence of both of the signals 1411 and 1421 or the absence of both of the signals 1201 and 1202. Then, the numeric check circuit 154 decides that "both of the 1st and 2nd transmission routes are abnormal or down." The output of the numeric check circuit 154 indicative of "both transmission routes down" appears on the signal line 1503. The change-over switch 11 changing over between the 1st and 2nd transmission routes is actuated by one of the outputs 1411 and 1421 of the respective error detection circuits 141 and 142. The logic is, for example, such that an AND circuit 155 which detects the presence of the abnormal detection signal 1411 and the absence of the abnormal detection signal 1421 energizes a coil 156 to change over from the 1st transmission route (connected to the serial-parallel conversion circuit 121) to the 2nd transmission route (connected to the serial-parallel conversion circuit 122), and another AND circuit 157 which detects the absence of the signal 1411 and the presence of the signal 1421 energizes another coil 158 to change over from the 2nd transmission route to the 1st transmission route. Reference numerals 159 and 160 designate inhibit circuits. When "both transmission routes down" is detected, the coils 156 and 158 are not energized, and the switch 11 is maintained in the original position.

FIG. 5 illustrates the manner of sequential processing executed by the differential decision circuit 20. Referring to FIG. 5, the circuit 20 includes an arithmetic circuit 200 making computation according to the known differential principle as described with reference to the expression (1), and its output is indicative of the presence of an internal trouble. Reference numeral 22 designates a well-known trouble detection relay such as an overcurrent relay or an undervoltage relay although it is not shown in FIG. 2. The outputs of the decision circuit 15, trouble detection relay 22 and arithmetic circuit 200 determines the trip output $t_d$ for tripping the circuit breakers.

Reference numerals 24, 25A, 25B, 27 and 28 designate AND circuits; 26, an OR circuit; 29, a NOT circuit, and 23, a NAND circuit.

(a) Routes are normal (Communication is not abnormal)

Both of the outputs from the trouble detection relay 22 and arithmetic circuit 200 are inputted to the AND circuits 25A, 25B, and 28. The AND circuit 24 receives the output from the relay 22.

When both the 1st and 2nd transmission routes are normal, no outputs appear from the trouble detection relay 22 and arithmetic circuit 200. Therefore, no outputs appear from the AND circuits 25A, 25B, 24 and 28, and the circuit breakers CB are not tripped. The output of the decision circuit 15 is also applied to these AND circuits 25A, 25B, 24 and 28. Therefore, only when the trouble detection relay 22 and arithmetic circuit 200 generate their outputs due to occurrence of a trouble, and the decision circuit 15 generates its output on one of the signal lines 1501 to 1503, the circuit breakers CB are tripped.

(b) Trouble occurred. (Communication is not abnormal)

The NAND circuit 23, AND circuit 27 and NOT circuit 29 act to decide that there is no abnormal communication and both of the 1st and 2nd transmission routes are normal. The NAND circuit 23 generates its output of "1" level since the outputs of the decision circuit 15 indicative of the fact that the 1st or 2nd transmission route is abnormal do not appear on the signal lines 1501 and 1502. Also, the output appearing on the signal line 1503 indicating the fact that both of the 1st and 2nd transmission routes are abnormal is in its "0" level. Consequently, the NOT circuit 29 generates its output of "1" level, and the AND circuit 27 generates its output of "1" level. Then, when the trouble detection relay 22 and arithmetic circuit 200 generate their outputs upon detection of a trouble, the AND circuit 28 generates its output of "1" level, and the trip output $t_d$ appears through the OR circuit 26.

(c) Trouble occurred. (Abnormal communication occurred in the 1st transmission route)

When no signal is received via the 1st transmission route, while the signal is received via the 2nd transmission route, the error detection circuit 141 generates its output 1411 shown in FIG. 6, but the error detection circuit 142 does not generate its output 1421. The AND circuit 155 acts to change over the switch 11 to the position connected to the serial-parallel conversion circuit 122. Consequently, the arithmetic circuit 200 executes the differential computation on the signal received via the 2nd transmission route. Upon detection of a trouble in the 1st transmission route, the arithmetic circuit 200 generates its output, and the trouble detection relay 22 also generates its output. Since the 1st transmission route is now abnormal, the specific information cannot be obtained via the 1st transmission route. The output of the adder 151 in FIG. 6 is indicative of "−K", and the output of the discrimination circuit 153 appears on the signal line 1501. Consequently, the AND circuit 15B in FIG. 5 generates its output of "1" level, and the trip output $t_d$ appears through the OR circuit 26.

(d) Trouble occurred. (Abnormal communication occurred in the 2nd transmission route)

When no signal is received via the 2nd transmission route, while the signal is received via the 1st transmission route, the error detection circuit 142 generates its output 1421 shown in FIG. 6, but the error detection circuit 141 does not generate its output. The AND circuit 157 acts to change over the switch 11 to the position connected to the serial-parallel conversion circuit 121. Consequently, the arithmetic circuit 200 executes the differential computation on the signal received via the 1st transmission route. Upon detection of a trouble in the 2nd transmission route, the arithmetic circuit 200 generates its output, and the trouble detection relay 22 also generates its output. Since the 2nd transmission route is now abnormal, the specific information cannot be obtained via the 2nd transmission route. The output of the adder 151 in FIG. 6 is indicative of "K", and the output of the discrimination circuit 152 appears on the signal line 1502. Consequently, the AND circuit 25A in FIG. 5 generates its output of "1" level, and the trip output $t_d$ appears through the OR circuit 26.

(e) Trouble occurred. (Abnormal communication occurred in both the 1st and 2nd transmission routes)

When the communication through both the 1st and 2nd transmission routes is abnormal, the signal of "1" level appears on the signal line 1503 shown in FIG. 6. In the presence of the signal of "1" level on the signal line 1503 and the output appearing from the trouble detection relay 22, the AND circuit 24 generates its output of "1" level so that the trip output $t_d$ appears through the OR circuit 26. In this case of "both routes down", the output of the arithmetic circuit 200 is insignificant.

It will thus be seen that the protective output is obtained reliably in any one of the above cases. Although the above description has referred to the operation of the carrier relay apparatus RYI disposed in the terminal station I only, it is apparent that the carrier relay apparatus RYII in the terminal station II is similarly constructed and operates. When the specific information sent out from the carrier relay apparatus RYII of the terminal station II on the 1st and 2nd transmission routes are "−K" and "K" respectively, the manner of processing described already with reference to FIG. 4 may be modified as shown in FIG. 7.

The above description has explained a representative embodiment of the present invention. Another embodiment which is a modification of the aforementioned embodiment will now be described.

In the aforementioned representative embodiment, the specific information K and −K are transmitted from the terminal station I to the terminal station II via the 1st and 2nd transmission routes, and these specific information K and −K received at the terminal station II are transmitted or returned intact or without any modification from the terminal station II.

In another embodiment of the present invention, the received specific information K and −K are suitably modified and such modified specific information are returned from the terminal station II to the terminal station I. For example, the specific information K received via the 1st transmission route may be modified to $(K+\Delta H)$ and the specific information −K received via the 2nd transmission route may be modified to $(K-\Delta H)$, or the specific information K received via the 1st transmission route may be modified to $(K-\Delta H)$ and the specific information −K received via the 2nd transmission route may be modified to $(-K+\Delta H)$. In such a case, a certain band is provided in the conditions of addition and decision in the decision circuit 15. it will be understood that the object of the present invention can also be achieved without in any way changing the fundamentals of the present invention.

Still another embodiment or another modification of the present invention will be described with reference to FIGS. 8 and 9.

Figure 8:
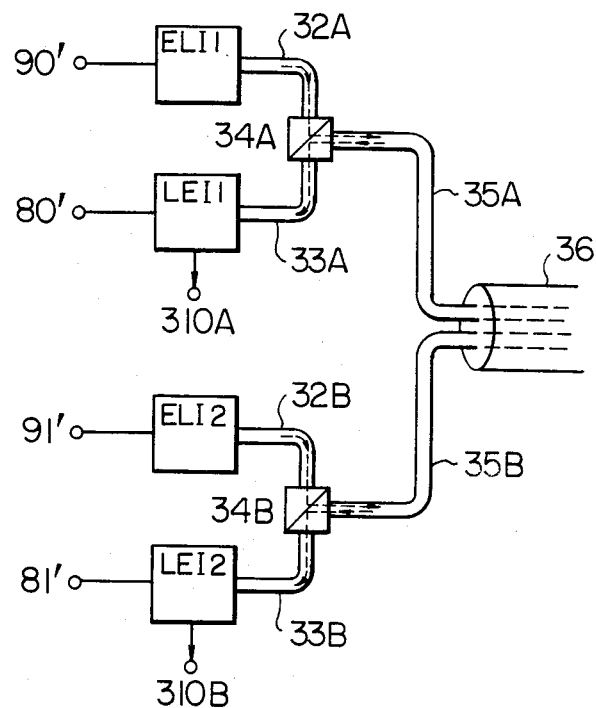
FIGS. 8 and 9 show another embodiment of the present invention in which two-way optical signal transmission routes are used.

Referring to FIG. 8, terminals 90', 91', 80' and 81' are connected to the terminals 90, 91, 80 and 81 respectively shown in FIGS. 1 and 2. Symbols ELI1, ELI2, LEI1 and LEI2 designate an electro-optical transducer circuit associated with the 1st transmission route, an electro-optical transducer circuit associated with the 2nd transmission route, an opto-electrical transducer circuit associated with the 1st transmission route and an optoelectrical transducer circuit associated with the 2nd transmission route, respectively. Reference numerals 32A, 32B, 33A, 33B, 35A, 35B designate optical fibers, and 34A, 34B designate optical directional coupler (used for dividing and coupling optical signal). Reference numeral 36 designates a two-core optical fiber cable containing the two optical fibers 35A and 35B. This optical fiber cable 36 is contained in, for example, an overhead ground wire (not shown). FIG. 8 illustrates that each of the optical fibers 35A and 35B is used as a two-way transmission route according to, for example, the technique of wavelength multiplexing.

Each of the opto-electrical transducer circuits LEI1 and LEI2 associated with the 1st and 2nd routes respectively includes a check circuit (not shown) which checks, for example, the level of the received optical signal and generates an abnormal detection output when an abnormal condition such as an extremely reduced level is detected. Such an abnormal detection output signal of "1" level appears at a terminal 310A of the opto-electrical transducer circuit LEI1 or at a terminal 310B of the opto-electrical transducer circuit LEI2 when such an extremely reduced level is detected. However, it is arranged so that no output signals appear at these terminals 310A and 310B when both the 1st and 2nd transmission routes are detected to be abnormal or down.

Figure 9:
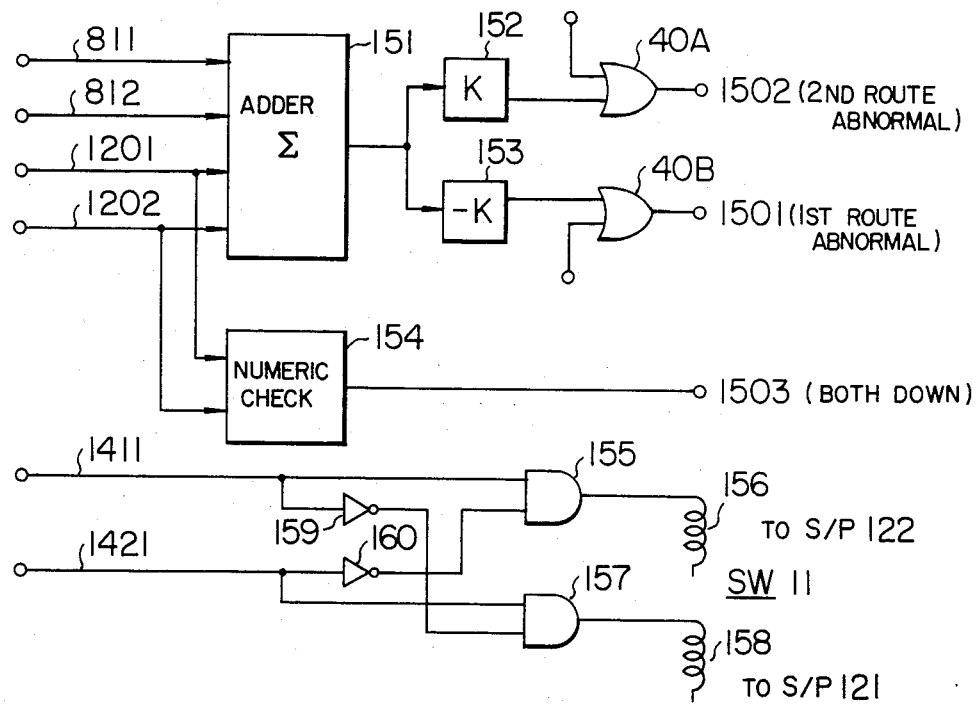

As illustrated in FIG. 9, two OR circuits 40A and 40B are additionally provided in the sequential processing part shown in FIG. 6 and are connected at one of their input terminals to the terminals 310A and 310B of the optoelectrical transducer circuits LEI1 and LEI2 respectively. It can be seen that an abnormal condition of the 1st or 2nd transmission route detected by the opto-electrical transducer circuit LEI1 or LEI2 can also be reflected in the system-trouble discriminating operation of the carrier relay apparatus. Similarly, it is apparent that abnormal detection outputs, classified by the 1st and 2nd transmission routes, of various equipments (for example, carrier terminal equipments) (not shown) provided in the transmission routes can also be reflected in the protective operation of the carrier relay apparatus.

It is apparent that the present invention is applicable to a carrier relay system including any number of terminal stations, and any other data can be used as the aforementioned specific information K, −K, k, −k, ΔH and −ΔH. Also, it is needless to mention that the present invention is applicable to a non-duplexed transmission route without the loss of its essential features. Further, although the description has referred to the application of the present invention to transmission routes using optical fibers, it can be readily understood that the present invention is in no way limited to such a specific application and is equally effectively applicable to communication cables, etc. Further, the transmission routes may be provided in the power transmission lines in lieu of the overhead ground wire.

We claim:

1. A carrier relay system including an overhead ground wire having at least two self-contained signal transmission routes, steel towers supporting said overhead ground wire together with power transmission lines, and protective relay apparatus disposed in first and second terminal stations, respectively, which exchanges information via said two signal transmission routes contained in said overhead ground wire and detecting to remove the source of a trouble, if any, which has occurred in said power transmission lines, wherein said protective relay apparatus disposed in the first terminal station transmits a first specific signal via the first signal transmission route and a second specific signal via the second signal transmission route, while said protective relay apparatus disposed in the second terminal station transmits a third specific signal via the first signal transmission route and a fourth specific signal via the second signal transmission route, and each of said protective relay apparatus comprises signed monitoring means for monitoring the specific signals transmitted from and received at the own terminal station, detecting means for detecting a trouble, if any, which has occurred in the power transmission lines, and means for generating a protective output protecting the power transmission lines on the basis of the outputs of said detecting means and said signal monitoring means, wherein said first and third specific signals have the same value, and said second and fourth specific signals have a value which is the polarity-inverted equivalent of the value of said first and third specific signals.

2. A carrier relay system including an overhead ground wire having at least two self-contained signal transmission routes, steel towers supporting said overhead ground wire together with power transmission lines, and protective relay apparatus disposed in first and second terminal stations, respectively, which exchanges information via said two signal transmission routes contained in said overhead ground wire and detecting to remove the source of a trouble, if any, which has occurred in said power transmission lines, wherein said protective relay apparatus disposed in the first terminal station transmits a first specific signal via the first signal transmission route and a second specific signal via the second signal transmission route, while said protective relay apparatus disposed in the second terminal station transmits a third specific signal via the first signal transmission route and a fourth specific signal via the second signal transmission route, and each of said protective relay apparatus comprises signal monitoring means for monitoring the specific signals transmitted from and received at the own terminal station, detecting means for detecting a trouble, if any, which has occurred in the power transmission lines, and means for generating a protective output protecting the power transmission lines on the basis of the outputs of said detecting means and said signal monitoring means, wherein the polarity of said third and fourth specific signals is inverted from that of said first and second specific signals, and the absolute value of said third specific signal differs from that of said first specific signal.

3. A carrier relay system comprising:
a power system having steel towers supporting power transmission lines together with an overhead ground wire including at least two signal transmission routes extending between a pair of terminal stations;
differential relay means responsive to a current signal detected in one terminal station connected to said two signal transmission routes for detecting trouble in said power system in accordance with a differential current between said current signal in said one terminal station and a current signal transferred from the other terminal station through said signal transmission routes, and including means for outputting a signal to open a current breaker of said one terminal station when trouble has occurred in said power system, a respective differential relay means being disposed at each of said terminal stations;
trouble detection relay means which detects a current or voltage of said one terminal station for detecting trouble in said power system, and for outputting a signal to open said circuit breaker of said one terminal station when trouble has occurred in said power system, a respective trouble detection relay means being disposed at each of said terminal stations;
signal transmitting means for transmitting a first specific signal to a first one of said signal transmission routes and a second specific signal to a second one of said signal transmission routes in said one terminal station, and for transmitting a third specific signal to said first one of said signal transmission routes and a fourth specific signal to said second one of said signal transmission routes in said other terminal station;
transmission detecting means for detecting a transmission trouble by comparing a specific signal transferred by said one terminal station with a specific signal received from said other terminal station;
means for opening said circuit breaker of said one terminal station when both said differential relay means and said trouble detection relay means output signals, and for inhibiting the opening of said circuit breaker in accordance with an output of said transmission detecting means; and
means for opening said circuit breaker when said transmission detecting means detects transmission troubles on said two signal transmission routes and said trouble detection relay means outputs said signal to open said circuit breaker.

4. A carrier relay system according to claim 3, wherein optical fiber cables are used as said signal transmission routes contained in said overhead ground wire.

5. A carrier relay system according to claim 3, wherein said first and third specific signals have the same value, and said second and fourth specific signals have a value which is the polarity-inverted equivalent of the value of said first and third specific signals.

6. A carrier relay system according to claim 3, wherein the polarity of said third and fourth specific signals is inverted from that of said first and second specific signals, and the absolute value of said third specific signal differs from that of said first specific signal.

7. A carrier relay system according to claim 3, wherein, when trouble is detected on one of said two signal transmission routes, a switch is changed over to receive the signal via one of said transmission routes and to apply the signal to said differential relay means and, when said transmission monitoring means detects trouble on one of said signal transmission routes or that both of said signal transmission routes are normal, the circuit breaker of said one terminal station is opened in the presence of the outputs from both of said differential relay means and said trouble detection relay means.

8. A carrier relay system comprising:
- a power system having steel towers supporting power transmission lines including at least two signal transmission routes extending between a pair of terminal stations;
- differential relay means responsive to a current signal detected in one terminal station to said two signal transmission routes and for detecting trouble in said power system in accordance with a differential current between said current signal in said one terminal station and a current signal transferred from the other terminal station through said signal transmission routes, and including means for outputting a signal to open a circuit breaker of said one terminal station when trouble has occurred in said power system, a respective differential relay means being disposed at each of said terminal stations;
- trouble detection relay means for detecting a current or voltage of said one terminal station to detect trouble in said power system and for outputting a signal to open said circuit breaker of said one terminal station when trouble has occurred in said power system, a respective trouble detection relay means being disposed at each of said terminal stations;
- transmission monitoring means for monitoring the signal transferred from the other terminal station through said signal transmission routes and for detecting a transmission trouble;
- means for opening said circuit breaker of said one terminal station when both said differential relay means and said trouble detection relay means output signals, and for inhibiting an opening of said circuit breaker in accordance with an output of said transmission monitoring means; and
- means for opening said circuit breaker when said transmission monitoring means detects transmission troubles on said two signal transmission routes and said trouble detection relay means outputs said signal to open said circuit breaker.

* * * * *